US010612315B2

(12) United States Patent
Ghamdi et al.

(10) Patent No.: US 10,612,315 B2
(45) Date of Patent: Apr. 7, 2020

(54) SMART SKIDDING SYSTEM FOR LAND OPERATIONS

(71) Applicant: Saudi Arabian Oil Company, Dhahran (SA)

(72) Inventors: Ibrahim A. Ghamdi, Dhahran (SA); Ossama R. Sehsah, Dhahran (SA); Mahmoud Adnan Alqurashi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 213 days.

(21) Appl. No.: 15/892,089

(22) Filed: Feb. 8, 2018

(65) Prior Publication Data
US 2019/0242195 A1 Aug. 8, 2019

(51) Int. Cl.
*E21B 15/00* (2006.01)
*H02K 17/02* (2006.01)
*F16H 19/04* (2006.01)
*E21B 7/02* (2006.01)

(52) U.S. Cl.
CPC .............. *E21B 15/003* (2013.01); *E21B 7/02* (2013.01); *F16H 19/04* (2013.01); *H02K 17/02* (2013.01)

(58) Field of Classification Search
CPC .................................. E21B 7/02; E21B 15/003
See application file for complete search history.

(56) References Cited

U.S. PATENT DOCUMENTS 4,068,487 A * 1/1978 Pease .................. B63B 35/4413
104/35
6,161,358 A 12/2000 Mochizuki et al.
6,171,027 B1 * 1/2001 Blankestijn .......... E02B 17/021
405/201

(Continued)

FOREIGN PATENT DOCUMENTS

GB 2161523 A 1/1986
KR 20170054943 A 5/2017
(Continued)

OTHER PUBLICATIONS

International Search Report and Written Opinion for International Application No. PCT/US2019/016983 report dated Apr. 17, 2019; pp. 1-12.

*Primary Examiner* — Jennifer H Gay
(74) *Attorney, Agent, or Firm* — Bracewell LLP; Constance G. Rhebergen; Vivek P. Shankam

(57) ABSTRACT

A smart skidding system includes a transverse skidding platform comprising a plurality of first skidding rails for skidding the a rig floor of the drilling rig sideways, wherein the plurality of first skidding rails are parallel to each other, a longitudinal skidding platform comprising a plurality of second skidding rails for skidding the rig floor of the drilling rig forward and backward, the plurality of second skidding rails being perpendicular to the plurality of first skidding rails, and a skidder unit configured to skid the rig floor of the drilling rig along the transverse skidding platform or the longitudinal skidding platform, the skidder unit further comprising a gear box assembly having a gear structure configured to engage with the plurality of first skidding rails and the plurality of second skidding rails, and an AC motor configured to drive the skidder unit.

17 Claims, 6 Drawing Sheets

(56) References Cited

U.S. PATENT DOCUMENTS

| | | | |
|---|---|---|---|
| 6,554,075 B2 * | 4/2003 | Fikes | E21B 15/003 166/379 |
| 6,609,573 B1 * | 8/2003 | Day | E21B 19/15 166/380 |
| 6,719,062 B2 * | 4/2004 | Fikes | E21B 15/003 166/379 |
| 6,932,553 B1 | 8/2005 | Roodenburg et al. | |
| 7,083,004 B2 | 8/2006 | Roodenburg et al. | |
| 8,561,685 B2 | 10/2013 | Rodgers | |
| 8,851,797 B1 | 10/2014 | Foo et al. | |
| 8,926,224 B2 * | 1/2015 | Seng | E21B 15/003 405/201 |
| 9,168,962 B2 | 10/2015 | Trevithick et al. | |
| 9,238,943 B2 * | 1/2016 | Jordan | B63B 35/4413 |
| 9,260,920 B2 * | 2/2016 | Seng | E21B 15/003 |
| 9,970,211 B2 * | 5/2018 | Konduc | E04H 12/34 |
| 2002/0074125 A1 | 6/2002 | Fikes | E21B 15/003 166/352 |
| 2003/0102166 A1 * | 6/2003 | Jortveit | E21B 15/003 175/162 |
| 2010/0260555 A1 * | 10/2010 | Foo | E21B 15/003 405/201 |
| 2011/0240371 A1 * | 10/2011 | Murr | E21B 7/02 175/220 |
| 2012/0067642 A1 * | 3/2012 | Magnuson | E21B 15/003 175/7 |
| 2013/0098627 A1 * | 4/2013 | Jordan | E21B 7/12 166/355 |
| 2013/0145718 A1 * | 6/2013 | Bryant, Jr. | E21B 15/00 52/650.3 |
| 2014/0262504 A1 * | 9/2014 | Seng | E21B 15/003 175/5 |
| 2014/0270974 A1 * | 9/2014 | Seng | E21B 15/003 405/201 |
| 2017/0101827 A1 * | 4/2017 | Orban | E21B 7/00 |
| 2017/0145918 A1 * | 5/2017 | Oehring | F02C 7/05 |
| 2017/0159372 A1 | 6/2017 | Zheng et al. | |
| 2017/0183957 A1 * | 6/2017 | Orban | E21B 47/122 |
| 2017/0275952 A1 | 9/2017 | Burns | |
| 2017/0321490 A1 * | 11/2017 | Haavind | E21B 15/02 |
| 2019/0242195 A1 * | 8/2019 | Ghamdi | E21B 7/02 |

FOREIGN PATENT DOCUMENTS

| | | | | |
|---|---|---|---|---|
| WO | WO-2014122470 A2 * | 8/2014 | | E21B 15/003 |
| WO | 2016144164 A1 | 9/2016 | | |
| WO | 2016175657 A1 | 11/2016 | | |

* cited by examiner

SMART SKIDDING SYSTEM FOR LAND OPERATIONS

TECHNICAL FIELD

Example embodiments generally relate to the field of drilling wells, and more particularly to an improved system and method for operating drilling equipment at oil and gas land-based well sites.

BACKGROUND

The present subject matter relates generally to a drilling rig, and more particularly to a multipurpose cantilever skidding frame that can be employed in a drilling rig. The present subject matter also relates to a drilling rig having a multi-direction direct cantilever skidding system that can be employed in a Jackup drilling unit or other types of mobile platforms.

The wells to be drilled may be arranged in a grid, requiring the drilling derrick to be moved in both longitudinal and transverse directions to access the various locations of the wells. In a traditional cantilever arrangement, a Jackup drilling unit or other mobile platform may access wells through a combination of a longitudinal motion of the cantilever that skids in and out of the Jackup hull, and a transverse skidding of the drill floor at the end of the cantilever. This arrangement may be effective if the well pattern is contained within a small envelope; however, the extent to which the drill floor can skid in a transverse direction is limited. In addition, as the load is significantly offset from the cantilever center to access the side wells loads on the side of the cantilever in the direction of the offset will be increased, usually resulting in a reduced load capacity for extreme transverse drilling positions.

A cantilever skidding system allowing a cantilever to skid in both longitudinal and transverse directions is disclosed in U.S. Pat. No. 6,171,027. In this system, a drill floor is fixedly mounted to a cantilever to solve the offset problem caused by the movable Jackup drilling unit. The transverse reach of the drill floor is enabled by the transverse cantilever skidding. The cantilever is movably connected to the supporting members which are movably connected to transverse rails. The cantilever moves longitudinally over the supporting members, and the cantilever together with the supporting members move transversely over the transverse rails. The supporting members thus support the cantilever at all times and carry the full weight of the cantilever even when it is retracted. During installation, the supporting members must be accurately aligned, and then the heavy cantilever, must be lifted and slowly slid into the supporting members. Such an operation is both challenging and complex. Further, once installed the supporting members are always under load and are therefore not able to be easily accessed for inspection and maintenance.

Offshore drilling and workover rigs, for example Jackup units daily cost is much higher than land rigs. It is known that offshore rigs in development fields are assigned to drill a batch of wells from the same location using a pre-set platform. The offshore rig will jack-up with a platform next to it, then skid the rig above the platform to drill the wells. The platform will be a guide for drilling the wells and a permanent facility to complete the wells with X-trees then connected to production lines. This is achievable with the skidding system offshore rigs equipped with to be able to adjust the rig floor above require slot on platform. However, land rigs need to move the entire rig from location to another to drill wells which involves high cost, requires time, and is a high level safety operation.

An important consideration in the design and construction of workover rigs in the servicing and treatment of wells is the ability to move efficiently between wells which are located a short distance from one another, such as, for example, wells in a cluster or in one or more rows in directional drilling operations. In the past, workover rigs have been so constructed and arranged that the derrick and its substructure must be disassembled to move between each well. It has also been proposed to utilize skids without disassembling the structure but has required some disassembly of the derrick and is undesirable from a number of standpoints including but not limited to the time and cost of installation each time that the rig has to be moved. In the past such installation has involved the utilization of cables or guide wires anchored in the ground to stabilize the derrick.

Accordingly, there is a need for a portable work-over rig which does not require cables or guide wires to support or anchor the derrick and to provide for a derrick and substructure which is completely automatic and can be advanced on skids between wellheads without disassembling the derrick or other parts of the rig and can be utilized on land as well as off-shore. Further, it is desirable to construct the derrick in such a way as to facilitate mechanical side-loading and unloading of pipe from and to raised pipe rack sections at the base of the derrick without necessity of threading or loading manually upward and downward through the base of the derrick.

SUMMARY

Example embodiments presented here upgrade land rigs to be equipped with smart skidding system that allows a land rig to drill up to fifteen wells from the same location for development fields by separating the substructure of the rig from the rig floor and the mast, and placing the smart skidding system above the substructure and below the mast and rotary table. The system allows the rig to skid outwards (longitudinal skidding) of the substructure to above the desired location (slot) to drill a well. Additionally, the system is able to skid sideways (transverse skidding) of substructure allowing it to cover wider area and be able to drill more wells. Accordingly, a batch drilling mode can be established onshore as it is an effective approach for offshore drilling. This can help facilitate with mud chemicals, equipment, and help build a learning curve while drilling in one area.

It is proven from reservoir engineering that well placement is a key element for maximizing reservoir production and optimizing hydrocarbon sweep. Batch drilling wells onshore utilizing rigs equipped with the smart skidding system can assure maximum recovery, and at the same time assure economical operational costs for the drilling operation and timely delivery.

One example embodiment is a smart skidding system for an on-shore drilling rig. The smart skidding system includes a transverse skidding platform including a plurality of first skidding rails for skidding the a rig floor of the drilling rig sideways, wherein the plurality of first skidding rails are parallel to each other, a longitudinal skidding platform including a plurality of second skidding rails for skidding the rig floor of the drilling rig forward and backward, wherein the plurality of second skidding rails are parallel to each other, the plurality of second skidding rails being perpendicular to the plurality of first skidding rails, and a skidder unit configured to skid the rig floor of the drilling rig along the transverse skidding platform or the longitudinal skidding platform, the skidder unit further including a gear box assembly having a gear structure configured to engage with the plurality of first skidding rails and the plurality of second skidding rails, and an AC motor configured to drive the skidder unit. The smart skidding system can be configured to be mounted on top of a rig substructure. The transverse skidding platform can be separated by the longitudinal skidding platform by a vertical distance that is adjustable. The transverse skidding platform can be mounted above the longitudinal skidding platform or the longitudinal skidding platform is mounted above the transverse skidding platform. The AC motor may include a 3 phase squirrel cage induction motor.

Another example embodiment is an on-shore batch drilling system including a rig mast attached to a rig floor, and a smart skidding system attached to the rig floor, the smart skidding system including a transverse skidding platform including a plurality of first skidding rails for skidding the rig floor of the drilling rig sideways, and a longitudinal skidding platform including a plurality of second skidding rails for skidding the rig floor of the drilling rig forward and backward, the plurality of second skidding rails being perpendicular to the plurality of first skidding rails. The smart skidding system further includes a skidder unit configured to skid the rig floor of the drilling rig along the transverse skidding platform or the longitudinal skidding platform, the skidder unit further including a gear box assembly having a gear structure configured to engage with the plurality of first skidding rails and the plurality of second skidding rails, and an AC motor configured to drive the skidder unit.

Another example embodiment is a method for drilling multiple on-shore wells using a single drilling rig. The method may include attaching a rig floor to a smart skidding system, the smart skidding system including a transverse skidding platform including a plurality of first skidding rails for skidding the rig floor of the drilling rig sideways, and a longitudinal skidding platform including a plurality of second skidding rails for skidding the rig floor of the drilling rig forward and backward, the plurality of second skidding rails being perpendicular to the plurality of first skidding rails. The method may also include skidding the rig floor of the drilling rig along the transverse skidding platform or the longitudinal skidding platform using a skidder unit, the skidder unit further including a gear box assembly having a gear structure configured to engage with the plurality of first skidding rails and the plurality of second skidding rails, and an AC motor configured to drive the skidder unit. The method may further include mounting the smart skidding system on top of a rig substructure. The method may also include adjusting a vertical distance between the transverse skidding platform and the longitudinal skidding platform. The method may further include mounting the transverse skidding platform above the longitudinal skidding platform or mounting the longitudinal skidding platform above the transverse skidding platform. The method may further include providing the skidder unit with a 3 phase squirrel cage induction motor.

BRIEF DESCRIPTION OF THE DRAWINGS

So that the manner in which the features, advantages and objects of the example embodiments, as well as others which may become apparent, are attained and can be understood in more detail, more particular description of the example embodiments briefly summarized above may be had by reference to the embodiment which is illustrated in the appended drawings, which drawings form a part of this specification. It is to be noted, however, that the drawings illustrate only example embodiments and is therefore not to be considered limiting of its scope as the invention may admit to other equally effective embodiments.

DETAILED DESCRIPTION

The methods and systems of the present disclosure will now be described more fully with reference to the accompanying drawings in which embodiments are shown. The methods and systems of the present disclosure may be in many different forms and should not be construed as limited to the illustrated embodiments set forth in this disclosure; rather, these embodiments are provided so that this disclosure will be thorough and complete, and will fully convey its scope to those skilled in the art. Like numbers refer to like elements throughout.

Figure 1:
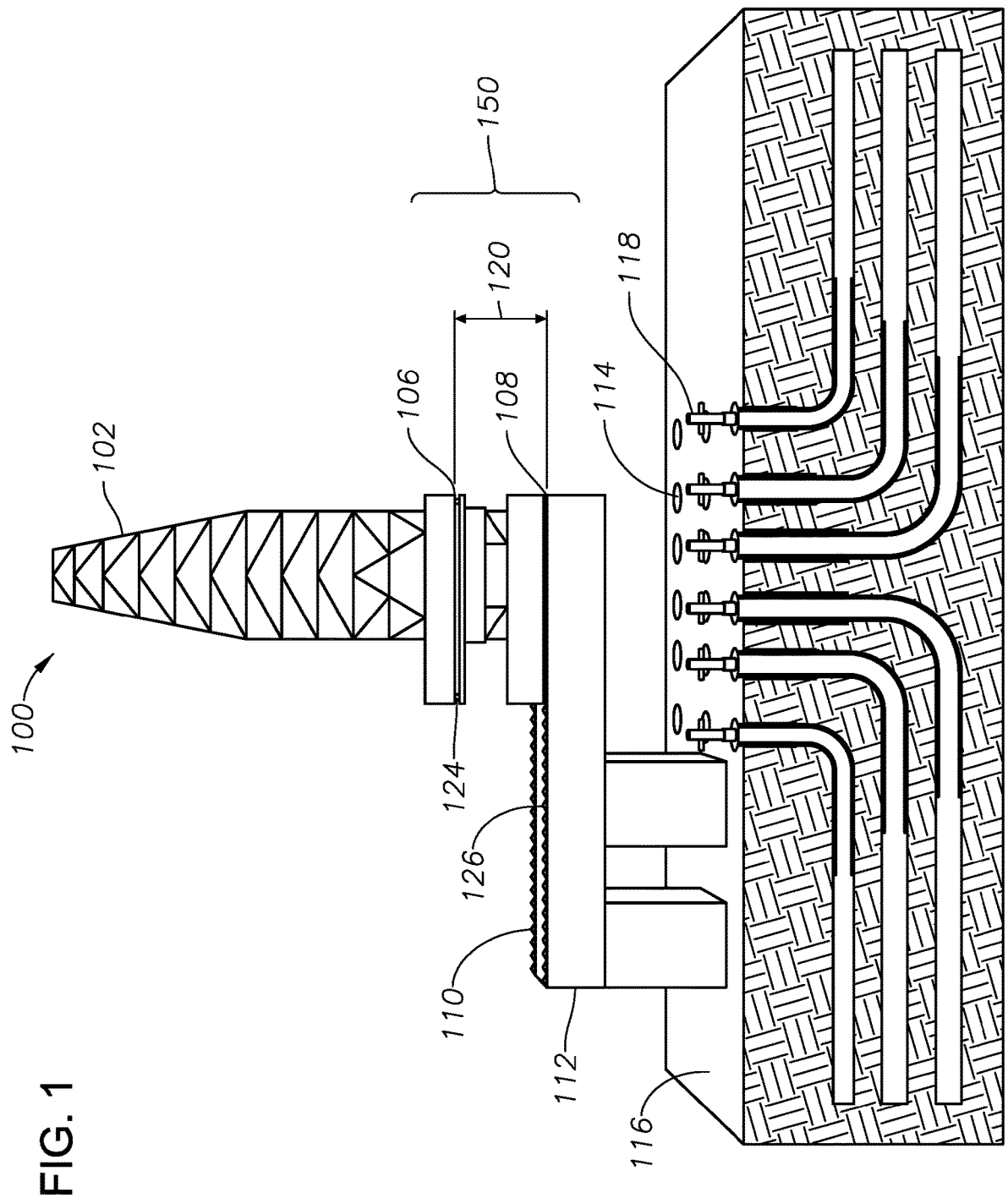
FIG. 1 is a schematic of an on-shore batch drilling system including a smart skidding system, according to one or more example embodiments of the disclosure.

Turning now to the figures, FIG. 1 is a schematic of an on-shore batch drilling system 100 including a smart skidding system 150, according to one or more example embodiments of the disclosure. The on-shore batch drilling system 100, for example, includes a rig mast 102 attached to a rig floor 104, and a smart skidding system 150 attached to the rig floor 104. The smart skidding system 150 may include a transverse skidding platform 106 having a plurality of first skidding rails 124 for skidding the rig floor 104 of the drilling rig sideways. The skidding rails 124 may be parallel to each other and may each have a plurality geared, toothed, or grooved structure with a plurality of teeth 110 of a predetermined height. The smart skidding system 150 may further include a longitudinal skidding platform 108 including a plurality of second skidding rails 126 for skidding the rig floor 104 of the drilling rig forward and backward. The skidding rails 126 may be parallel to each other and may each have a plurality geared, toothed, or grooved structure with a plurality of teeth 110 of a predetermined height. In one embodiment, the plurality of second skidding rails 126 is perpendicular to the plurality of first skidding rails 124. However, there may be other variations where the plurality of second skidding rails 126 may not perpendicular to the plurality of first skidding rails 124, and may be laid at an angle to the first skidding rails 124. The smart skidding system 150 can be configured to be mounted on top of a rig substructure 112 of the drilling rig. The transverse skidding platform 106 can be separated by the longitudinal skidding platform 108 by a vertical distance 120 that may be adjustable.

The smart skidding system 150 may further include one or more skidder units (shown in further detail in FIGS. 5-7) configured to skid the rig floor 104 of the drilling rig along the transverse skidding platform 106 or the longitudinal skidding platform 108. Once mounted, the smart skidding system 150 allows the drilling rig to move along two axes such that it traverses sideways along rails 124 or forward and backward along rails 126, and therefore dig multiple wells 114 in the subsurface formation 116. The smart skidding system 150 may also be used to install plug and abandon systems 118 when a well is found to be unproductive or may not be in use.

Figure 2:
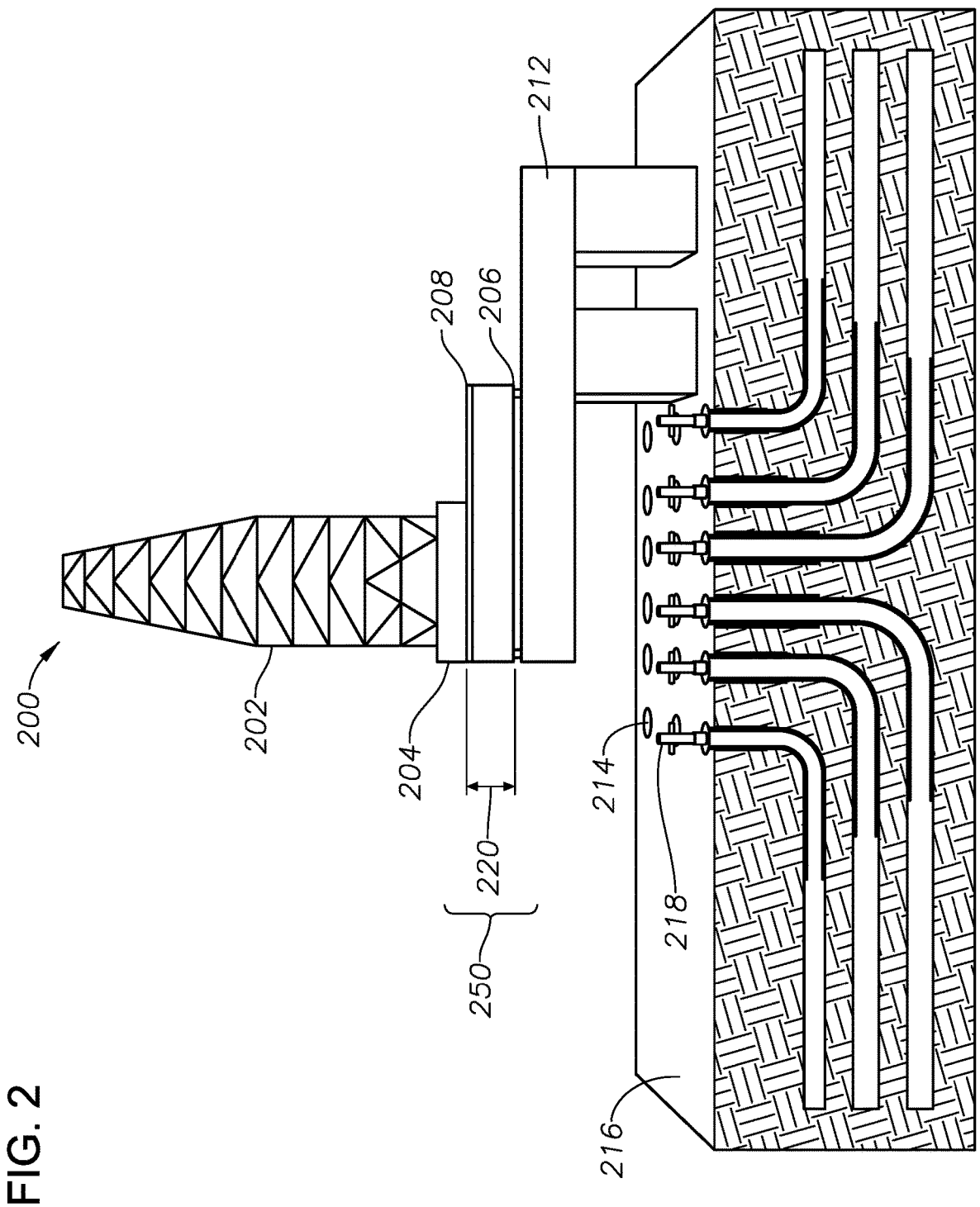
FIG. 2 is a schematic of an on-shore batch drilling system including a smart skidding system, according to one or more example embodiments of the disclosure.

FIG. 2 is a schematic of an on-shore batch drilling system 200 including a smart skidding system 250, according to one or more example embodiments of the disclosure. In this embodiment, the longitudinal skidding platform 208 is mounted above the transverse skidding platform 206. The on-shore batch drilling system 200, for example, includes a rig mast 202 attached to a rig floor 204, and a smart skidding system 250 attached to the rig floor 204. The smart skidding system 250 may include a transverse skidding platform 206 having a plurality of first skidding rails for skidding the rig floor 204 of the drilling rig sideways. The skidding rails may be parallel to each other and may each have a plurality geared, toothed, or grooved structure with a plurality of teeth of a predetermined height. The smart skidding system 250 may further include a longitudinal skidding platform 208 including a plurality of second skidding rails for skidding the rig floor 204 of the drilling rig forward and backward. The skidding rails may be parallel to each other and may each have a plurality geared, toothed, or grooved structure with a plurality of teeth of a predetermined height. In one embodiment, the plurality of second skidding rails is perpendicular to the plurality of first skidding rails. However, there may be other variations where the plurality of second skidding rails may not perpendicular to the plurality of first skidding rails, and may be laid at an angle to the first skidding rails. The smart skidding system 250 can be configured to be mounted on top of a rig substructure 212 of the drilling rig. The transverse skidding platform 206 can be separated by the longitudinal skidding platform 208 by a vertical distance 220 that may be adjustable.

Once mounted, the smart skidding system 250 allows the drilling rig to move along two axes such that it traverses sideways along rails on skidding platform 206 or forward and backward along rails on skidding platform 208, and therefore dig multiple wells 214 in the subsurface formation 216. The smart skidding system 250 may also be used to install plug and abandon systems 218 when a well is found to be unproductive or may not be in use.

Figure 3:
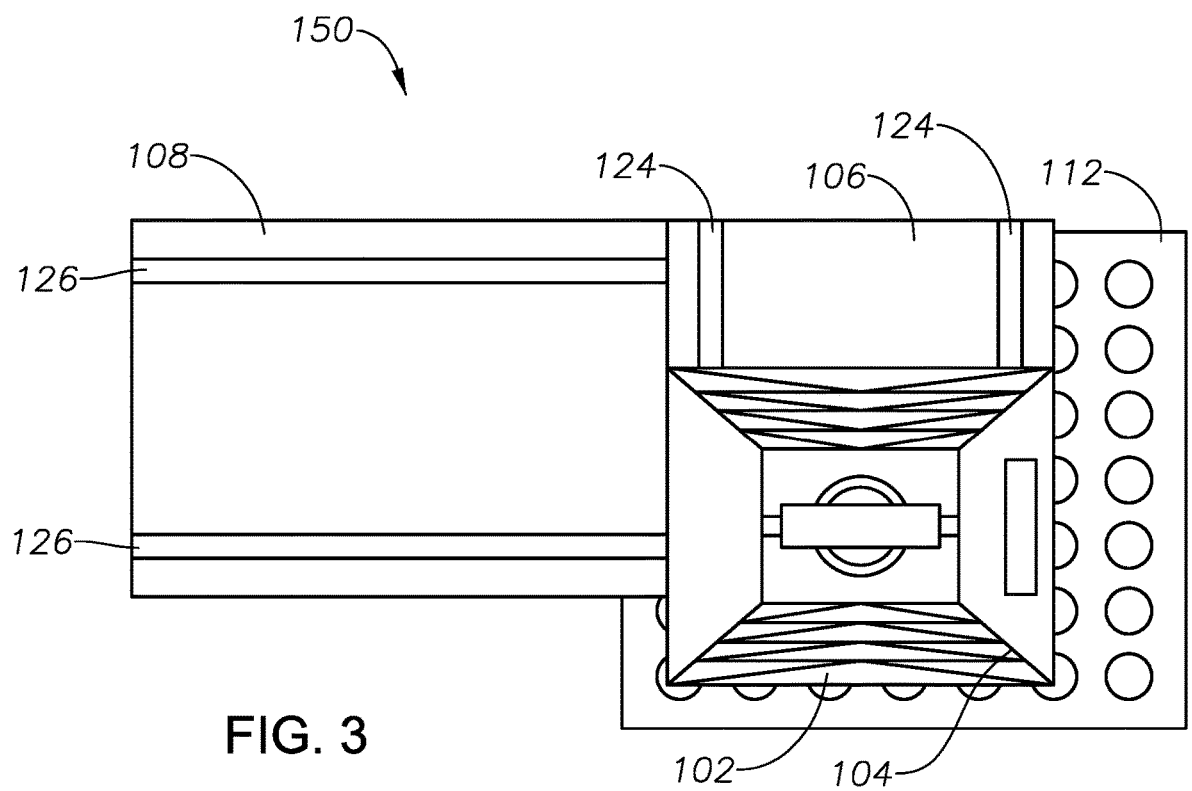
FIG. 3 illustrates a top view of the smart skidding system in an extended position, according to one or more example embodiments of the disclosure.

FIG. 3 illustrates a top view of the smart skidding system 150 in an extended position, according to one or more example embodiments of the disclosure. As seen in this figure, the rig floor 102 and therefore the mast 104 are on the far right end of the longitudinal skidding platform 108, but at the bottom end of the transverse skidding platform 106. The plurality of second skidding rails 126 is perpendicular to the plurality of first skidding rails 124. However, there may be other variations where the plurality of second skidding rails 126 may not perpendicular to the plurality of first skidding rails 124, and may be laid at an angle to the first skidding rails 124.

Figure 4:
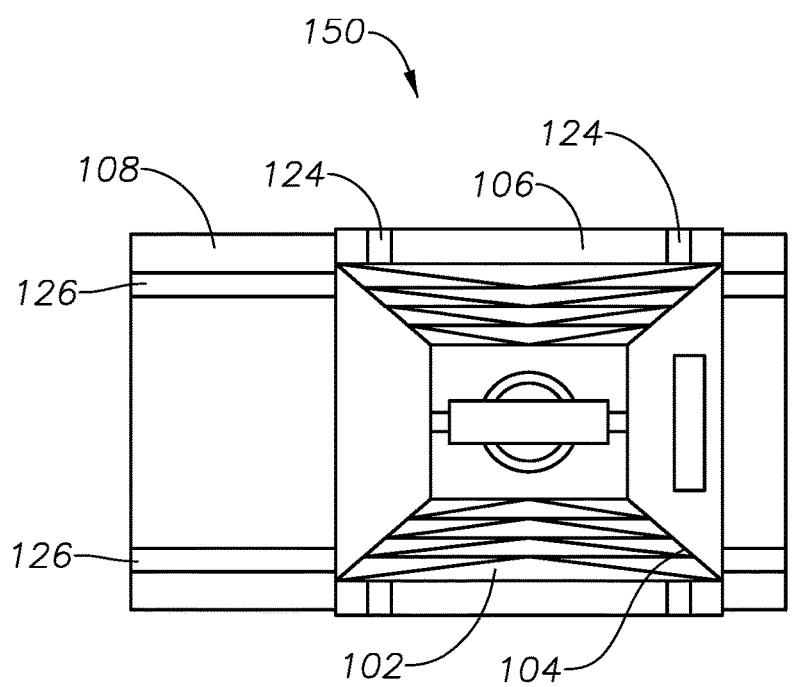
FIG. 4 illustrates a top view of the smart skidding system in a retracted position, according to one or more example embodiments of the disclosure.

FIG. 4 illustrates a top view of the smart skidding system 150 in a retracted position, according to one or more example embodiments of the disclosure. As seen in this figure, the rig floor 102 and the mast 104 have been moved left from the far right end of the longitudinal skidding platform 108, and to the center of the transverse skidding platform 106. These movements enable drilling of multiple wells within a predetermined area with just a single drilling rig, and therefore improve the quality, health, safety, and environment of the on-shore drilling operation.

Figure 5:
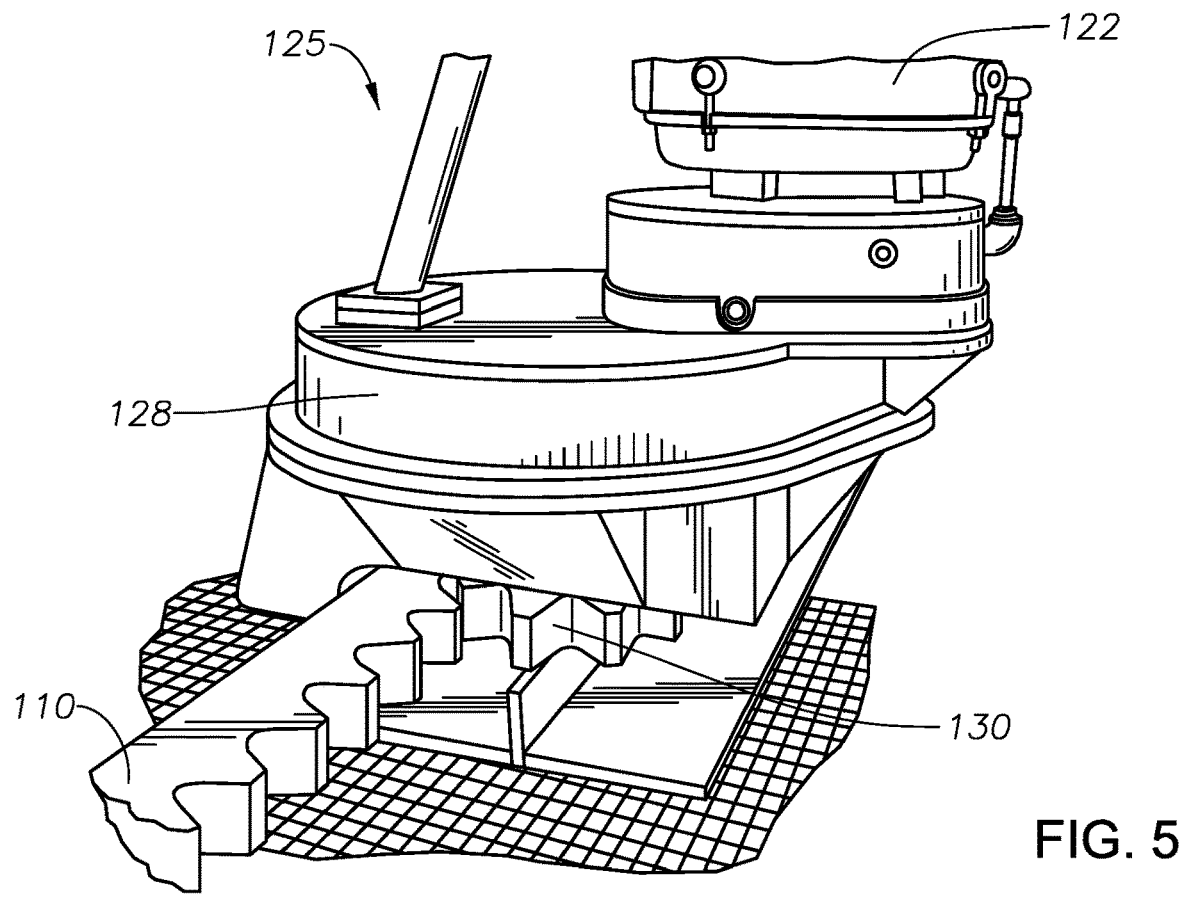
FIG. 5 is a photograph of a skidder unit in a smart skidding system, according to one or more example embodiments of the disclosure.

FIG. 5 is a photograph of a skidder unit 125 in a smart skidding system 150, according to one or more example embodiments of the disclosure. The skidder unit 125 includes a gear box assembly 128 having a gear structure 130 configured to engage with teeth 110 in the plurality of first skidding rails 124 and the plurality of second skidding rails 126. The skidder unit gearbox assembly 128 can include a gearing structure 130 with a 69.33 overall gear ratio, and a 7-tooth, 1-pitch output pinion, for example. The skidder unit 125 may further include an AC motor 122 that may be configured to drive the skidder unit 125. The AC motor 122 can be a 3 phase squirrel cage induction motor with a speed of at least 900 RPM with, for example, a 8-tooth, 6-pitch drive pinion. In some example embodiments, the induction motor may include an electromagnetic multiple disk brake, and the electromagnetic multiple disk brake of the induction motor can be 10-face, 3-segment, for example. The skidder unit 125 may be able to provide 250,000 lbs thrust or even more. In some example embodiments, the skidder unit 125 may be able to provide 275,000 lbs thrust or more. In some example embodiments, the skidder unit 125 may be able to provide 300,000 lbs thrust or more. In some embodiments, the skidder unit 125 may be directly attached to the rig floor and/or the mast for faster movement.

Figure 6:
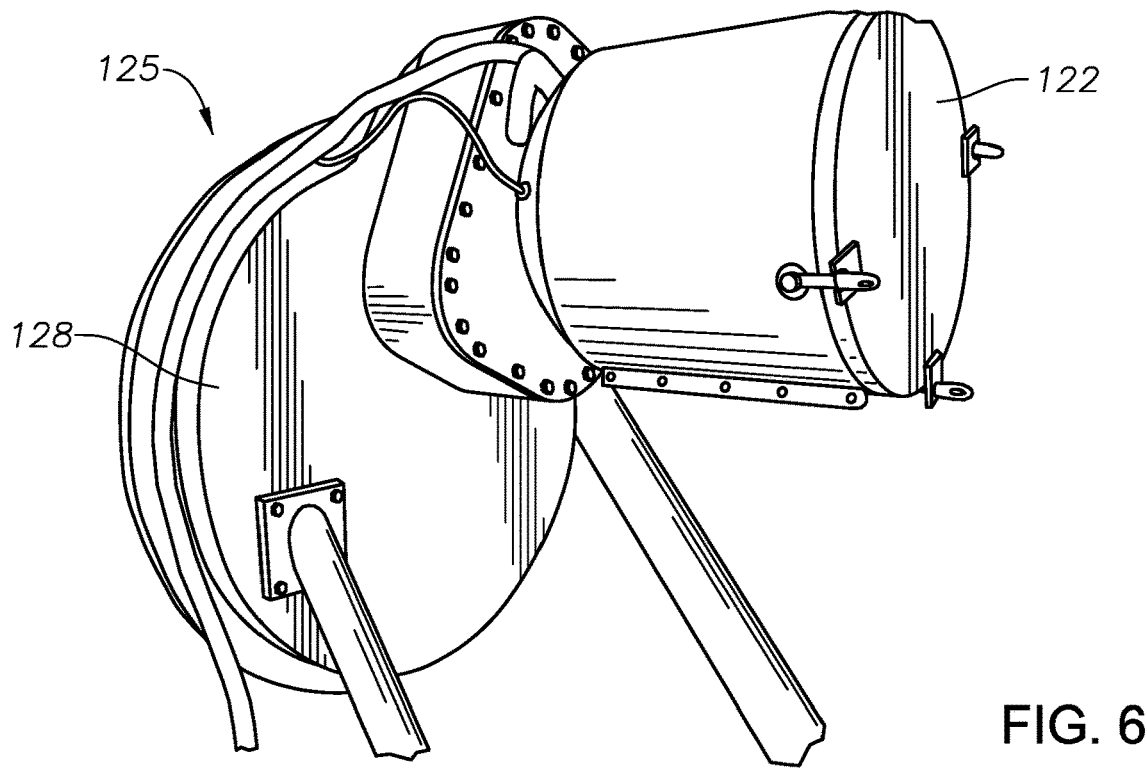
FIG. 6 is another view of the skidder unit shown in FIG. 5, according to one or more example embodiments of the disclosure.
Figure 7:
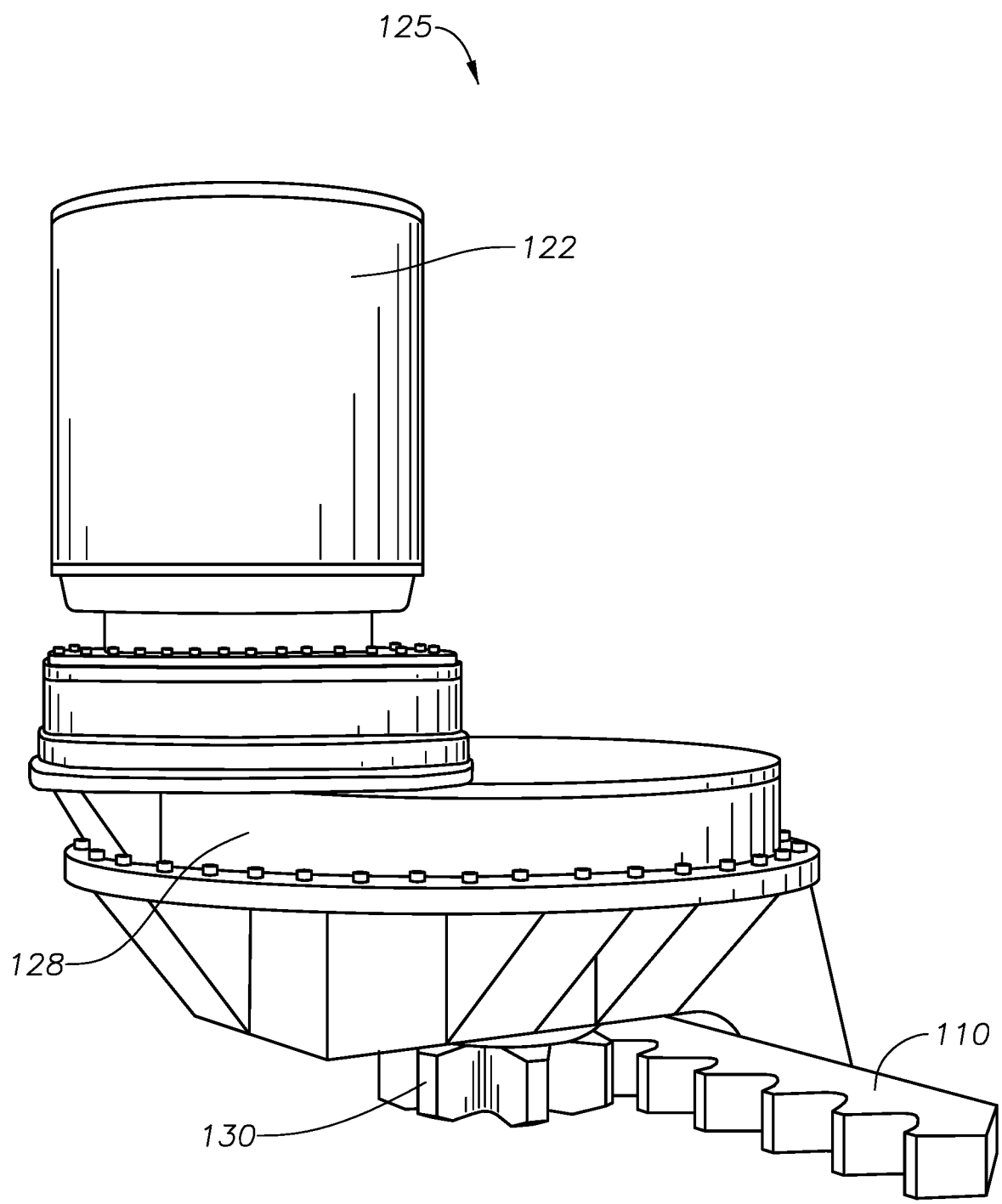
FIG. 7 is a profile view of the skidder unit shown in FIG. 5, according to one or more example embodiments of the disclosure.

FIG. 6 is another view of the skidder unit 125 shown in FIG. 5, according to one or more example embodiments of the disclosure. FIG. 7 is a profile view of the skidder unit 125 shown in FIG. 5, according to one or more example embodiments of the disclosure. When the rig is ready to move, the smart skidding system 150 allows the rig to shape back to its typical setup. Then, typical land rigs move can carry on. The average rig move cost for land rigs is around $100,000 with a minimum of five days of shutdown. Therefore, the present smart skidding system provides an opportunity for a major cost saving by reducing all the risks and safety hazards related to rig moves for the number of wells this system can introduce. There are techniques to move the rig from location to location similar to skidding, but they have a lot of limitations and they are not able to drill as many as fifteen wells, as can be achieved using the systems and methods disclosed here. The prior art techniques are not as efficient as the smart skidding system 150, which doesn't require a high footprint or line extensions.

Some advantages of the smart skidding system 150 include the ability to maximize wells placement in a reservoir for optimum reservoir sweeping. Another advantage is that more than fifteen wells can be drilled in a single well site. Another advantage is the elimination or reduction in costs, time, and resources associated with a rig move. Another advantage is the utilization of a single well site location with less maintenance. Another advantage is the ability to solve oil field time and well delivery problems, enhance well delivery, enhance safety and improve the quality, health, safety, and environment of the on-shore drilling operation. Another advantage is less rigs per well required, and therefore saving resources and manpower.

Figure 8:
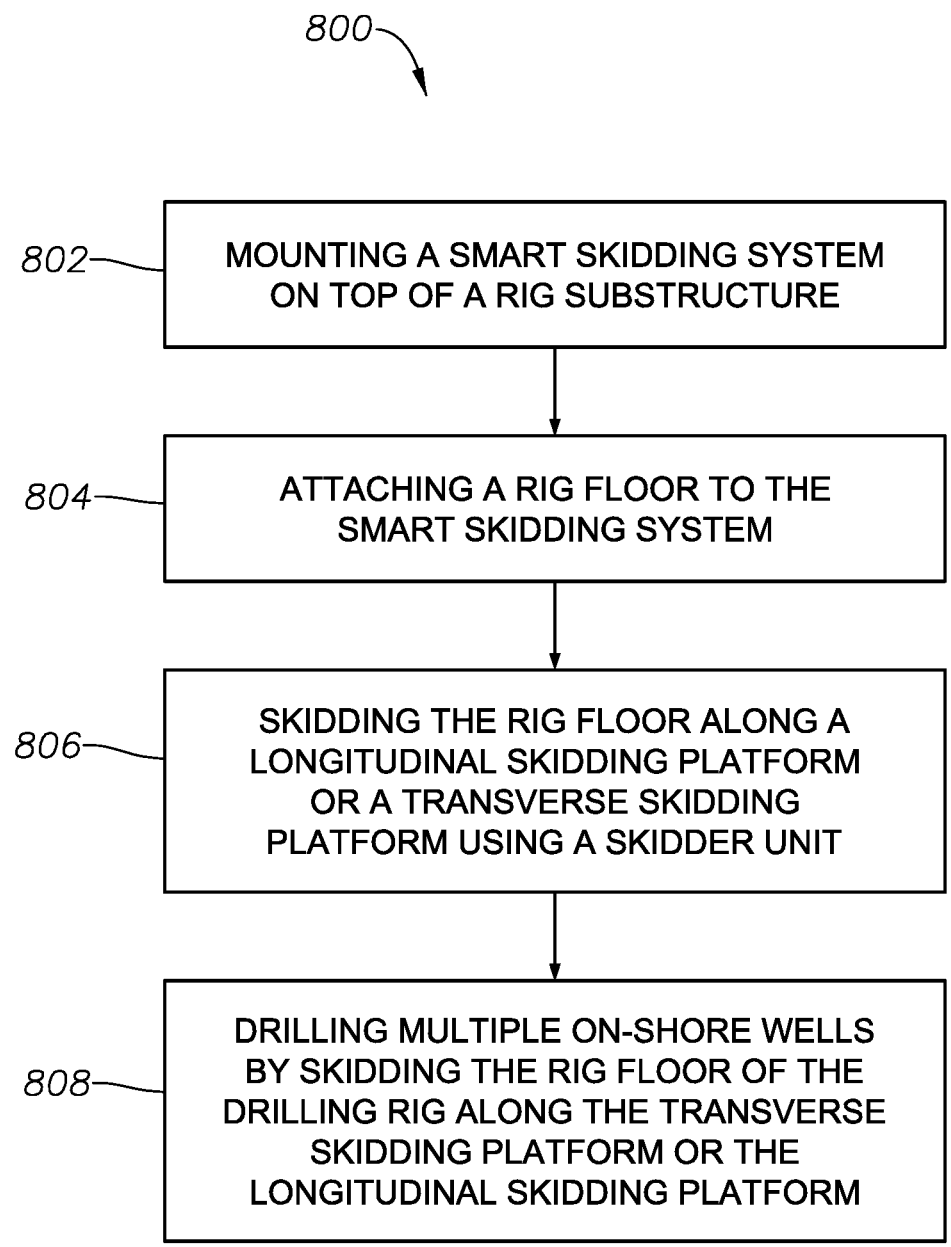
FIG. 8 illustrates example steps in a method for drilling multiple on-shore wells using a single drilling rig, according to one or more example embodiments of the disclosure.

FIG. 8 illustrates example steps in a method 800 for drilling multiple on-shore wells using a single drilling rig, according to one or more example embodiments of the disclosure. At step 802, the method may include mounting a smart skidding system, such as that shown in FIGS. 1-4, on top of a rig substructure. At step 804, the method may include attaching a rig floor to a smart skidding system, the smart skidding system including a transverse skidding platform including a plurality of first skidding rails for skidding the rig floor of the drilling rig sideways, and a longitudinal skidding platform including a plurality of second skidding rails for skidding the rig floor of the drilling rig forward and backward. The plurality of second skidding rails may be perpendicular to the plurality of first skidding rails. At step 806, the method may also include skidding the rig floor of the drilling rig along the transverse skidding platform or the longitudinal skidding platform using a skidder unit. The skidder unit may include a gear box assembly having a gear structure configured to engage with the plurality of first skidding rails and the plurality of second skidding rails, and an AC motor configured to drive the skidder unit. The method may also include adjusting a vertical distance between the transverse skidding platform and the longitudinal skidding platform. The method may further include mounting the transverse skidding platform above the longitudinal skidding platform or mounting the longitudinal skidding platform above the transverse skidding platform. Lastly, the method may include, at step 808, drilling multiple on-shore wells by skidding the rig floor of the drilling rig along the transverse skidding platform or the longitudinal skidding platform. These movements enable drilling of multiple wells within a predetermined area with just a single drilling rig, and therefore improve the quality, health, safety, and environment of the on-shore drilling operation.

Some advantages of the present method include the ability to maximize wells placement in a reservoir for optimum reservoir sweeping. Another advantage is that more than fifteen wells can be drilled in a single well site. Another advantage is the elimination or reduction in costs, time, and resources associated with a rig move. Another advantage is the utilization of a single well site location with less maintenance. Another advantage is the ability to solve oil field time and well delivery problems, enhance well delivery, enhance safety and improve the quality, health, safety, and environment of the on-shore drilling operation. Another advantage is less rigs per well required, and therefore saving resources and manpower.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements or operations. Thus, such conditional language generally is not intended to imply that features, elements or operations are in any way required for one or more implementations or that one or more implementations necessarily include logic for deciding, with or without user input or prompting, whether these features, elements or operations are included or are to be performed in any particular implementation.

The systems and methods described, therefore, are well adapted to carry out the objects and attain the ends and advantages mentioned, as well as others that may be inherent. While example embodiments of the system and method has been given for purposes of disclosure, numerous changes exist in the details of procedures for accomplishing the desired results. These and other similar modifications may readily suggest themselves to those skilled in the art, and are intended to be encompassed within the spirit of the system and method disclosed and the scope of the appended claims.

The invention claimed is:

1. A skidding system for an on-shore drilling rig, the skidding system comprising:
    a transverse skidding platform comprising a plurality of first skidding rails for skidding a rig floor of the drilling rig sideways, wherein the plurality of first skidding rails are parallel to each other;
    a longitudinal skidding platform comprising a plurality of second skidding rails for skidding the rig floor of the drilling rig forward and backward, wherein the plurality of second skidding rails are parallel to each other, the plurality of second skidding rails being perpendicular to the plurality of first skidding rails; and
    a skidder unit configured to skid the rig floor of the drilling rig along the transverse skidding platform or the longitudinal skidding platform, the skidder unit further comprising a gear box assembly having a gear structure configured to engage with the plurality of first skidding rails and the plurality of second skidding rails, and an AC motor configured to drive the skidder unit,
    wherein the transverse skidding platform is separated by the longitudinal skidding platform by a vertical distance that is adjustable.

2. The skidding system of claim 1, wherein the skidding system is configured to be mounted on top of a rig substructure.

3. The skidding system of claim 1, wherein the transverse skidding platform is mounted above the longitudinal skidding platform.

4. The skidding system of claim 1, wherein the longitudinal skidding platform is mounted above the transverse skidding platform.

5. The skidding system of claim 1, wherein the AC motor comprises a 3 phase squirrel cage induction motor.

6. An on-shore batch drilling system comprising:
a rig mast attached to a rig floor; and
a skidding system attached to the rig floor, the skidding system comprising:
   a transverse skidding platform comprising a plurality of first skidding rails for skidding the rig floor of the drilling rig sideways; and
   a longitudinal skidding platform comprising a plurality of second skidding rails for skidding the rig floor of the drilling rig forward and backward, the plurality of second skidding rails being perpendicular to the plurality of first skidding rails,
   wherein the transverse skidding platform is separated by the longitudinal skidding platform by a vertical distance that is adjustable.

7. The batch drilling system of claim 6, wherein the skidding system further comprises a skidder unit configured to skid the rig floor of the drilling rig along the transverse skidding platform or the longitudinal skidding platform, the skidder unit further comprising a gear box assembly having a gear structure configured to engage with the plurality of first skidding rails and the plurality of second skidding rails, and an AC motor configured to drive the skidder unit.

8. The batch drilling system of claim 6, wherein the skidding system is configured to be mounted on top of a rig substructure.

9. The batch drilling system of claim 7, wherein the AC motor comprises a 3 phase squirrel cage induction motor.

10. The batch drilling system of claim 6, wherein the transverse skidding platform is mounted above the longitudinal skidding platform.

11. The batch drilling system of claim 6, wherein the longitudinal skidding platform is mounted above the transverse skidding platform.

12. A method for drilling multiple on-shore wells using a single drilling rig, the method comprising:
attaching a rig floor to a skidding system, the skidding system comprising:
   a transverse skidding platform comprising a plurality of first skidding rails for skidding the rig floor of the drilling rig sideways; and
   a longitudinal skidding platform comprising a plurality of second skidding rails for skidding the rig floor of the drilling rig forward and backward, the plurality of second skidding rails being perpendicular to the plurality of first skidding rails; and
drilling multiple on-shore wells by skidding the rig floor of the drilling rig along the transverse skidding platform or the longitudinal skidding platform; and
adjusting a vertical distance between the transverse skidding platform and the longitudinal skidding platform.

13. The method of claim 12, further comprising:
skidding the rig floor of the drilling rig along the transverse skidding platform or the longitudinal skidding platform using a skidder unit, the skidder unit further comprising a gear box assembly having a gear structure configured to engage with the plurality of first skidding rails and the plurality of second skidding rails, and an AC motor configured to drive the skidder unit.

14. The method of claim 13, further comprising:
providing the skidder unit with a 3 phase squirrel cage induction motor.

15. The method of claim 12, further comprising:
mounting the skidding system on top of a rig substructure.

16. The method of claim 12, further comprising:
mounting the transverse skidding platform above the longitudinal skidding platform.

17. The method of claim 12, further comprising:
mounting the longitudinal skidding platform above the transverse skidding platform.

\* \* \* \* \*